(12) United States Patent
Sun et al.

(10) Patent No.: US 7,317,843 B2
(45) Date of Patent: Jan. 8, 2008

(54) LUMINANCE CORRECTION

(75) Inventors: Jian Sun, Beijing (CN); Jiaya Jia, Kowloon (HK); Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 10/817,633

(22) Filed: Apr. 1, 2004

(65) Prior Publication Data
US 2005/0220359 A1  Oct. 6, 2005

(51) Int. Cl.
*G06K 9/40* (2006.01)
*G06K 9/00* (2006.01)

(52) U.S. Cl. .................. 382/274; 382/254; 382/264
(58) Field of Classification Search .............. None
See application file for complete search history.

(56) References Cited

U.S. PATENT DOCUMENTS

| | | | | |
|---|---|---|---|---|
| 5,450,502 | A * | 9/1995 | Eschbach et al. | 382/169 |
| 5,982,926 | A * | 11/1999 | Kuo et al. | 382/167 |
| 6,075,889 | A * | 6/2000 | Hamilton et al. | 382/167 |
| 6,101,272 | A * | 8/2000 | Noguchi | 382/167 |
| 6,198,844 | B1 * | 3/2001 | Nomura | 382/168 |
| 6,463,173 | B1 * | 10/2002 | Tretter | 382/168 |
| 6,556,704 | B1 * | 4/2003 | Chen | 382/154 |
| 6,636,646 | B1 * | 10/2003 | Gindele | 382/274 |
| 6,760,485 | B1 * | 7/2004 | Gilman et al. | 382/274 |
| 6,807,299 | B2 * | 10/2004 | Sobol | 382/166 |
| 6,807,319 | B2 * | 10/2004 | Kovvuri et al. | 382/275 |
| 6,879,731 | B2 * | 4/2005 | Kang et al. | 382/274 |
| 6,937,775 | B2 * | 8/2005 | Gindele et al. | 382/254 |
| 6,993,200 | B2 * | 1/2006 | Tastl et al. | 382/240 |
| 7,075,569 | B2 * | 7/2006 | Niikawa | 348/218.1 |
| 2003/0137597 | A1 * | 7/2003 | Sakamoto et al. | 348/371 |
| 2003/0174886 | A1 * | 9/2003 | Iguchi et al. | 382/167 |
| 2004/0234152 | A1 * | 11/2004 | Liege et al. | 382/254 |

OTHER PUBLICATIONS

Ben-Ezra, M., Nayar, S. K.; "Motion Deblurring Using Hybrid Imaging", CVPR Jul. 2003, pp. 1-8.
"Eye-Controlled Auto-Focus" Published on Canon Malaysia's Corporate Website, Published at least as early as Mar. 2004. 3 pages.
"Lightening-Fast Technology: Combatting te Effects of Camera Shake" Published on Nikon Web Magazine at least as early as Mar. 2004, 5 pages.
Reinhard, E., Ashikhmin, M., Gooch, B.; "Color Transfer Between Images" IEEE Computer Graphics and Applications, Sep./Oct. 2001, pp. 34-41.
Ruderman, D. L., Cronin, T. W., Chiao, C.-C.; "Statistics of Cone Responses to Natural Images: Implications for Visual Coding" Journal of the Optical Society of America vol. 15, No. 8, Aug. 1998, pp. 2036-2045.

(Continued)

*Primary Examiner*—Vikkram Bali
*Assistant Examiner*—Mia M Thomas
(74) *Attorney, Agent, or Firm*—Lee & Hayes, PLLC

(57) ABSTRACT

Techniques are disclosed to improve quality of images that may be blurred or underexposed. In one described implementation, a method includes providing two images of a same scene. The method determines a spatial coherence and color statistics of the two images. The determined color statistics and spatial coherence are utilized to enhance one of the two images.

31 Claims, 13 Drawing Sheets

OTHER PUBLICATIONS

Reinhard, E., Stark, M., Shirley, P., Ferwerda, J.; "Photographic Tone Reproduction for Digital Images" Proceedings of the 29th annual conference on Computer graphics and interactive techniques San Antonio, Texas 2002. pp. 267-276.

Rav-Acha, A., Peleg, S.; "Restoration of Multiple Images with Motion Blur in Different Directions" Fifth IEEE Workshop on Applications of Computer Vision Dec. 4-6, 2000 Palm Springs, California, p. 22 (7 pgs).

Liu, X., Ei Gamal, A.; "Simultaneous Image Formation and Motion Blur Restoration via Multiple Capture" ICASSP'2001 conference, Salt Lake City, Utah, May 2001. 4 pages.

Kundur, D., Hatzinakos, D.; "A Novel Blind Deconvolution Scheme for Image Restoration Using Recursive Filtering" IEEE Transactions on Signal Processing, vol. 46, No. 2, Feb. 1998, pp. 375-390.

Grossberg, M. D., Nayar, S. K.; "What can be Known about the Radiometric Response from Images?" ECCV (4) 2002: pp. 189-205.

Bascle B. et al; "Motion Deblurring and Super-resolution from an Image Sequence" Lecture Notes in Computer Science, v.2 1996, pp. 573-582.

Fabian R. et al.; "Robust Identification of Motion and Out-of-Focus Blur Parameters from Blurred and Noisy Images" CVGIP: Graphical Models and Image Processing, v53 n4, Jul. 1991, pp. 40-412.

Yitzhaky Y. et al.; "Direct Method for Restoration of Motion-blurred Images" Journal of the Optical Society of America, v15 n6 Jun. 1998, pp. 1512-1519.

Yitzhaky Y. et al.; "Restoration of an Image Degraded by Vibrations Using Only a Single Frame" Optical Engineering, v39 n8 Aug. 2000, pp. 2083-2091.

\* cited by examiner $I_L$ $I_H$ $I_C$

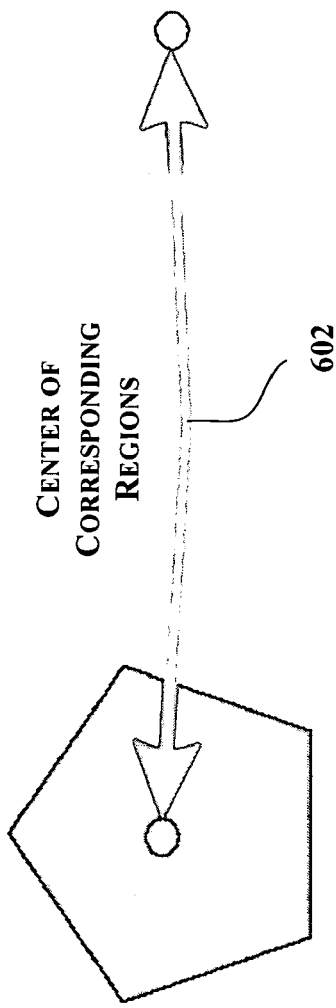
FIG. 6A
FIG. 6B
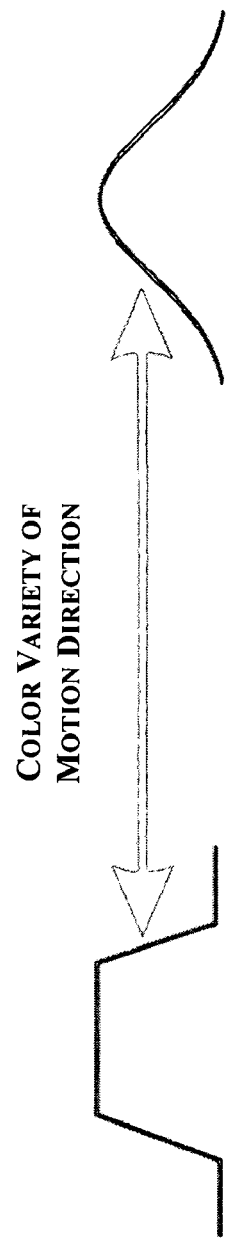
FIG. 7A
FIG. 7B

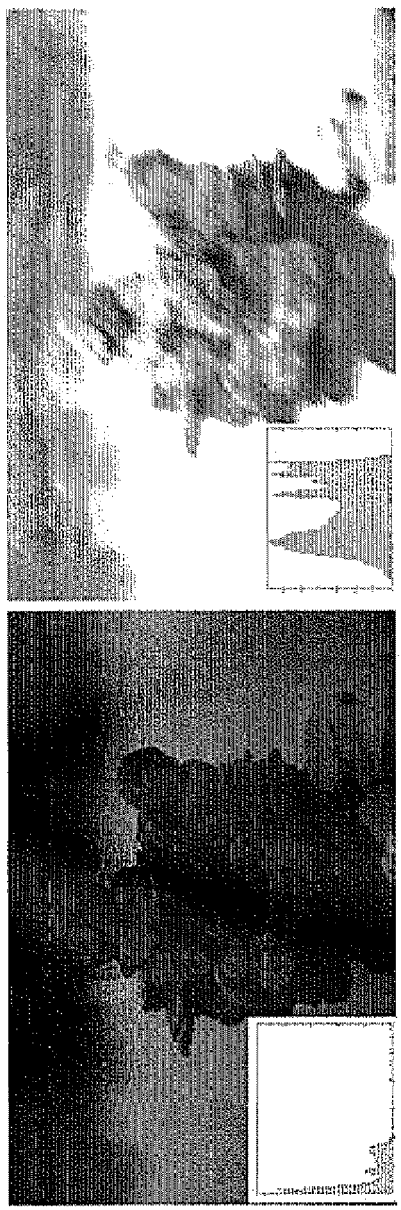
FIG. 18
FIG. 19
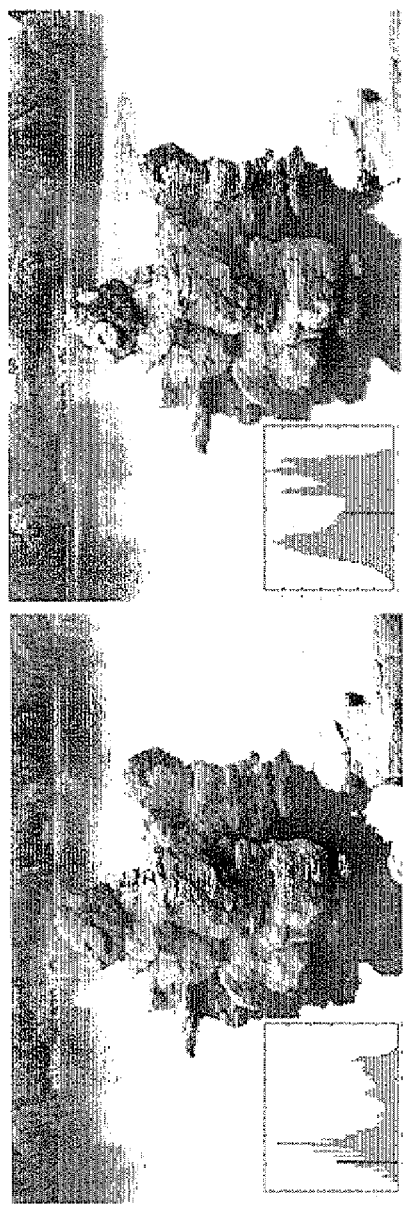
FIG. 20
FIG. 21

FIG. 25
FIG. 26
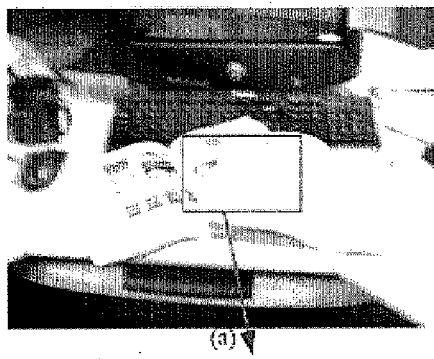
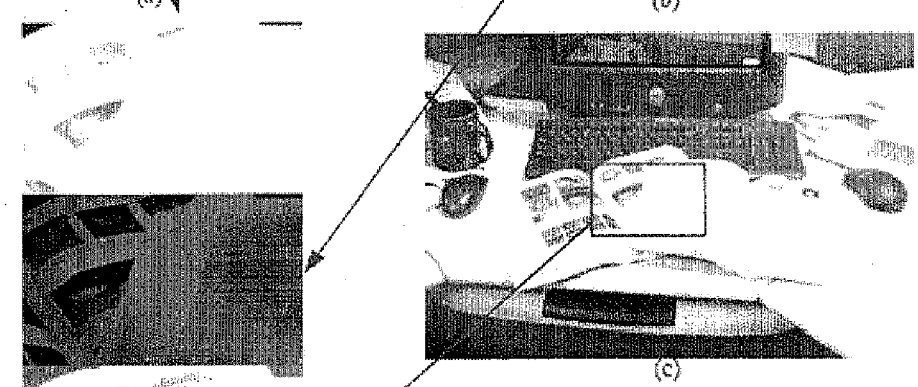
FIG. 27
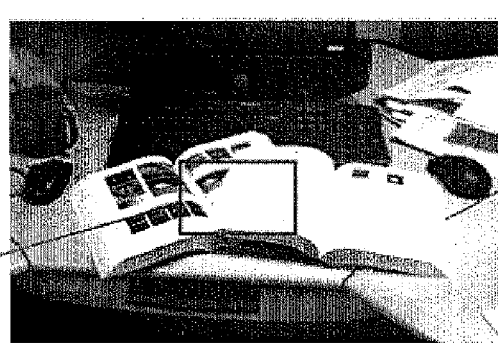
FIG. 28

LUMINANCE CORRECTION

TECHNICAL FIELD

The present invention generally relates to image processing, and more particularly, to luminance correction.

BACKGROUND

When photographing a scene, light rays emitted from objects within the scene are recorded on a film such as regular film or digital film. Hence, photography involves the recording of these light rays. When lighting conditions are improper (e.g., when photographing in low light), pictures lack some of the scene information when compared with pictures taken in sufficient lighting conditions.

Taking satisfactory photos under dim lighting conditions has historically posed a very difficult problem. Often, the images are blurred and/or underexposed. Underexposures generally results from not exposing the film to sufficient amounts of light. Underexposure may be somewhat corrected by exposing the film for a longer period, for example, by using a lower shutter speed to keep the shutter open for a longer period. Lower shutter speed, however, results in blurring. The blurring problem is exasperated when using a hand-held camera (e.g., rather than a tripod), in part, because of the increased movement during shutter openings. Blurring may also occur due to movement of the objects within the scene during shutter openings.

A couple of common solutions include use of flashes (to compensate for low lighting by introducing additional lighting) or a film with higher ISO (a prefix set by the International Organization for Standardization).

Using flashes is limiting for a variety of reasons. For example, flashes are only operational over relatively short distances. Also, flashes may result in change of colors, yielding an inaccurate representation of the scene. Multiple flashes (e.g., with remote activation) may be utilized to improve the results of flash photography, but setting up several flashes around a scene may not always be feasible (e.g., in outdoor photography or when capturing shots with short notice).

Higher ISO film is also limiting for a number of reasons. In traditional photography, the film is often only changeable one roll at a time. Accordingly, when a camera is loaded with higher ISO film (e.g., suitable for low lighting conditions), the camera can not be used for normal lighting conditions without limiting the photographers options (e.g., where pictures have to be taken at higher shutter speeds to avoid overexposure). In digital photography, the performance of higher ISO settings entirely depends on the camera sensor, which can significantly vary between different cameras. Moreover, an even more important shortcoming is the relatively higher amount of noise that results from using the higher ISO.

Currently, there are several techniques for improving the quality of blurred images, e.g., resulting from an exposure time above the safe shutter speed. Generally, the safe shutter speed is a speed no slower than the reciprocal of the focal length of the lens. These techniques can be roughly classified into in-process and post-process approaches which limit motion blur due to, for example, a long exposure time, camera shake, or object movement.

In-process approaches are mainly hardware-based techniques, where lens stabilization is achieved by camera shake compensation. Alternatively, high-speed digital cameras (such as those with complementary metal oxide semiconductor (CMOS) sensors) can perform high-speed frame captures within normal exposure time which allows for multiple image-based motion blur restoration. The in-process techniques are able to produce relatively clear and crisp images, given a reasonable exposure time. However, they require specially designed hardware devices.

On the other hand, post-process methods can be generally considered as motion deblurring techniques. Among them, blind deconvolution is widely adopted to enhance a single blurred image, which may be applied under different assumptions on the point spread function (PSF). Alternatively, several images with different blurring directions or an image sequence can be used, in more general situations, to estimate the PSF. In both cases, due to the discretization and quantization of images in both spatial and temporal coordinates, the PSF can not be reliably estimated, which produces a result inferior to the ground truth image (which is an image either taken with a camera on a tripod or of a static scene with correct exposure). A hybrid imaging system consisting of a primary (high spatial resolution) detector and a secondary (high temporal resolution) detector has also been proposed. The secondary detector provides more accurate motion information to estimate the PSF; thus, making deblurring possible even under long exposure. However, this technique needs additional hardware support, and the deblurred images are still not visibly as good as the ground truth in detail.

Accordingly, the present solutions fail to provide sufficient image quality.

SUMMARY

Techniques are disclosed to improve quality of images that may be blurred or underexposed (e.g., because of camera shake, taken in dim lighting conditions, or taken of high action scenes).

In one described implementation, a method includes providing two images of a same scene. The method determines a spatial coherence and color statistics of the two images. The determined color statistics and spatial coherence are utilized to enhance one of the two images.

In another described implementation, a method includes providing an underexposed image of a scene and a blurred image of the same scene. The method determines a spatial coherence and color statistics of the images. By utilizing the color statistics and spatial coherence, the underexposed image is enhanced.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 6A shows a homogeneous region from an original image, while FIG. 6B shows the same region taken with motion blur.

FIGS. 7A and 7B illustrate curves of pixel colors along one direction.

FIGS. 18-21 illustrate the ability of the methodologies described herein to optimally combine the color information of two input images with varying exposure periods.

Sample images associated with a high contrast scene implementation are shown in FIGS. 25-28.

Figure 29:
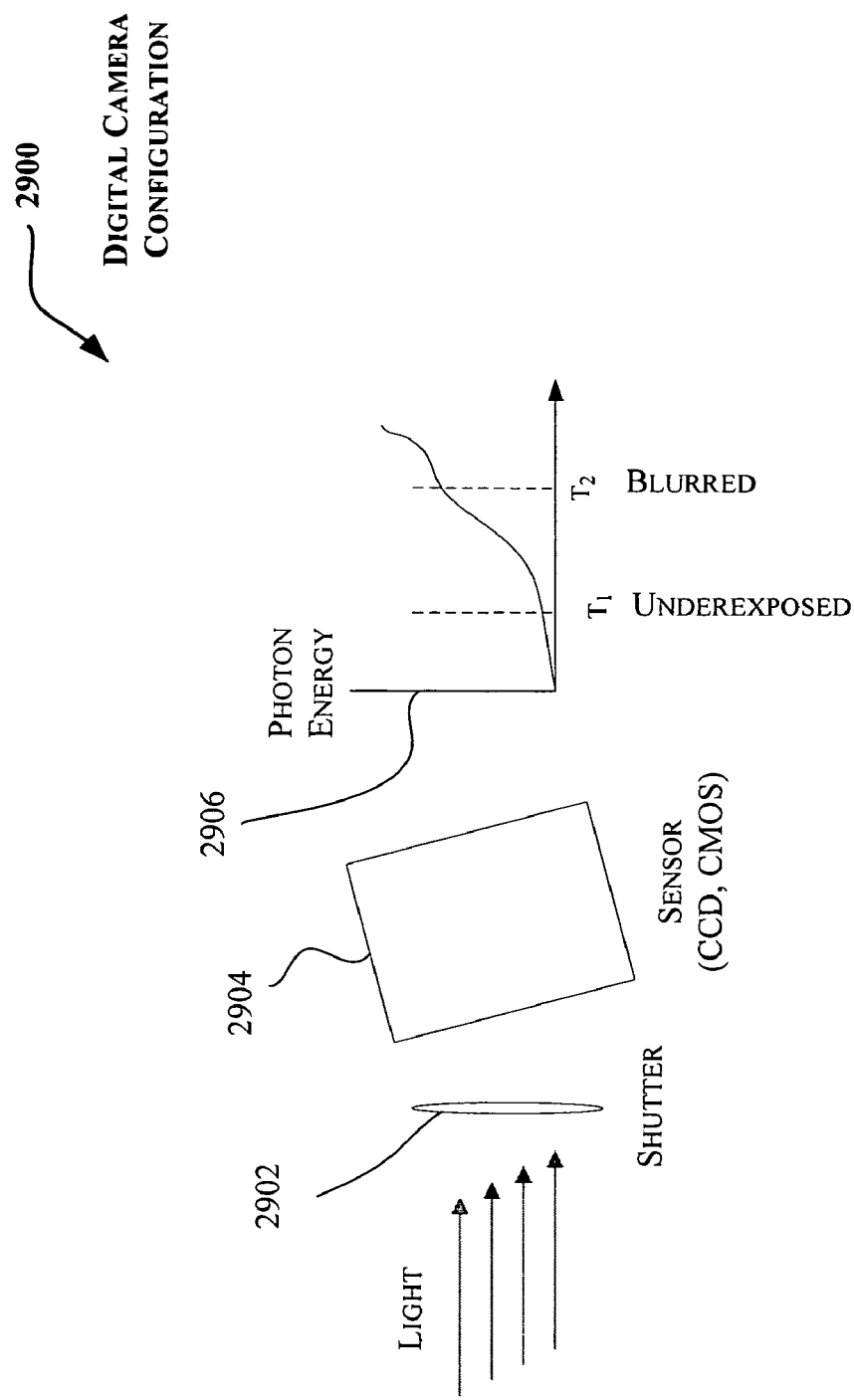

FIG. 29 illustrates an exemplary digital camera configuration for taking multiple shoots at a time that may be utilized to provide luminance correction.

Figure 30:
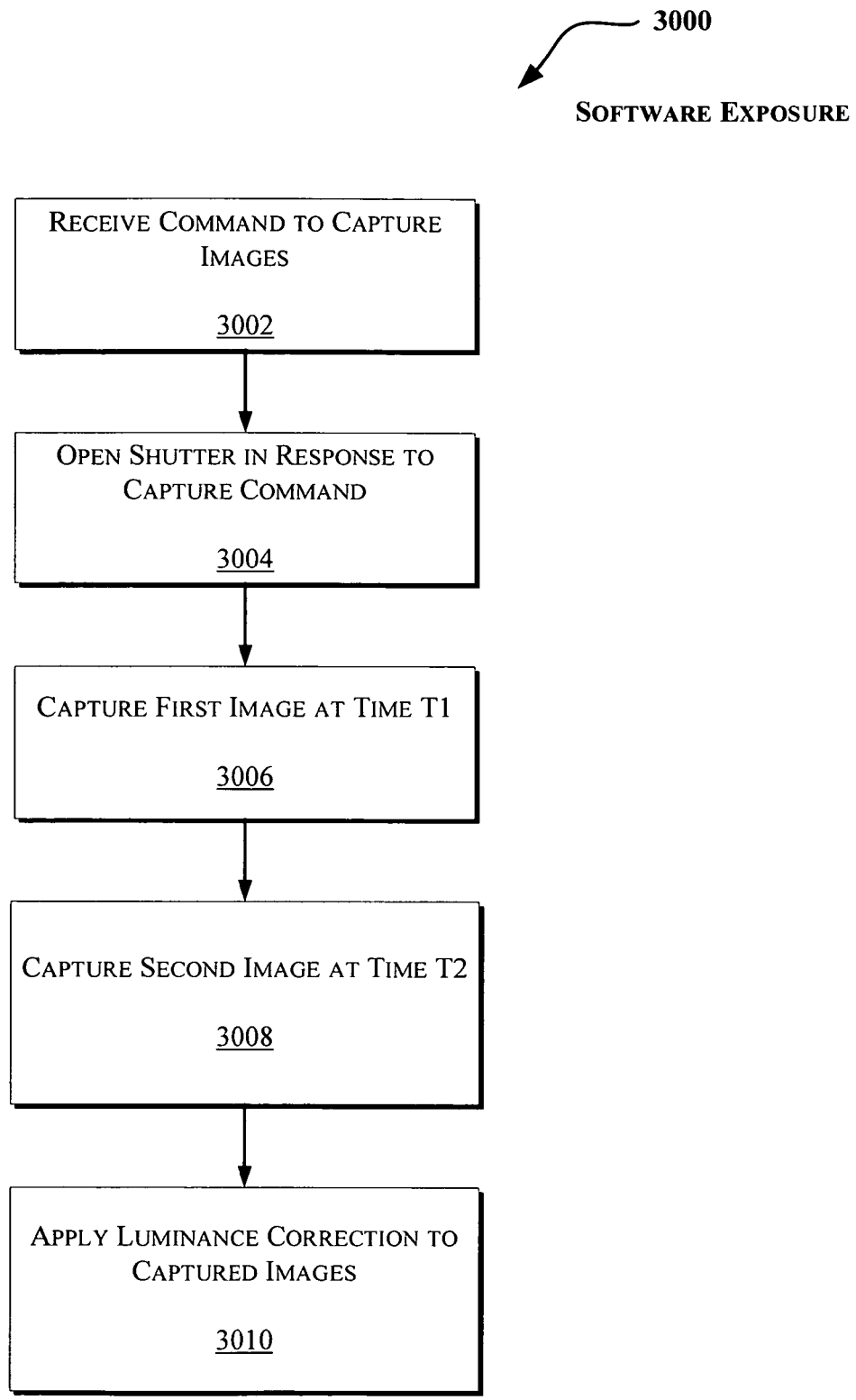

FIG. 30 illustrates an exemplary method for controlling camera exposure via software.

Figure 31:
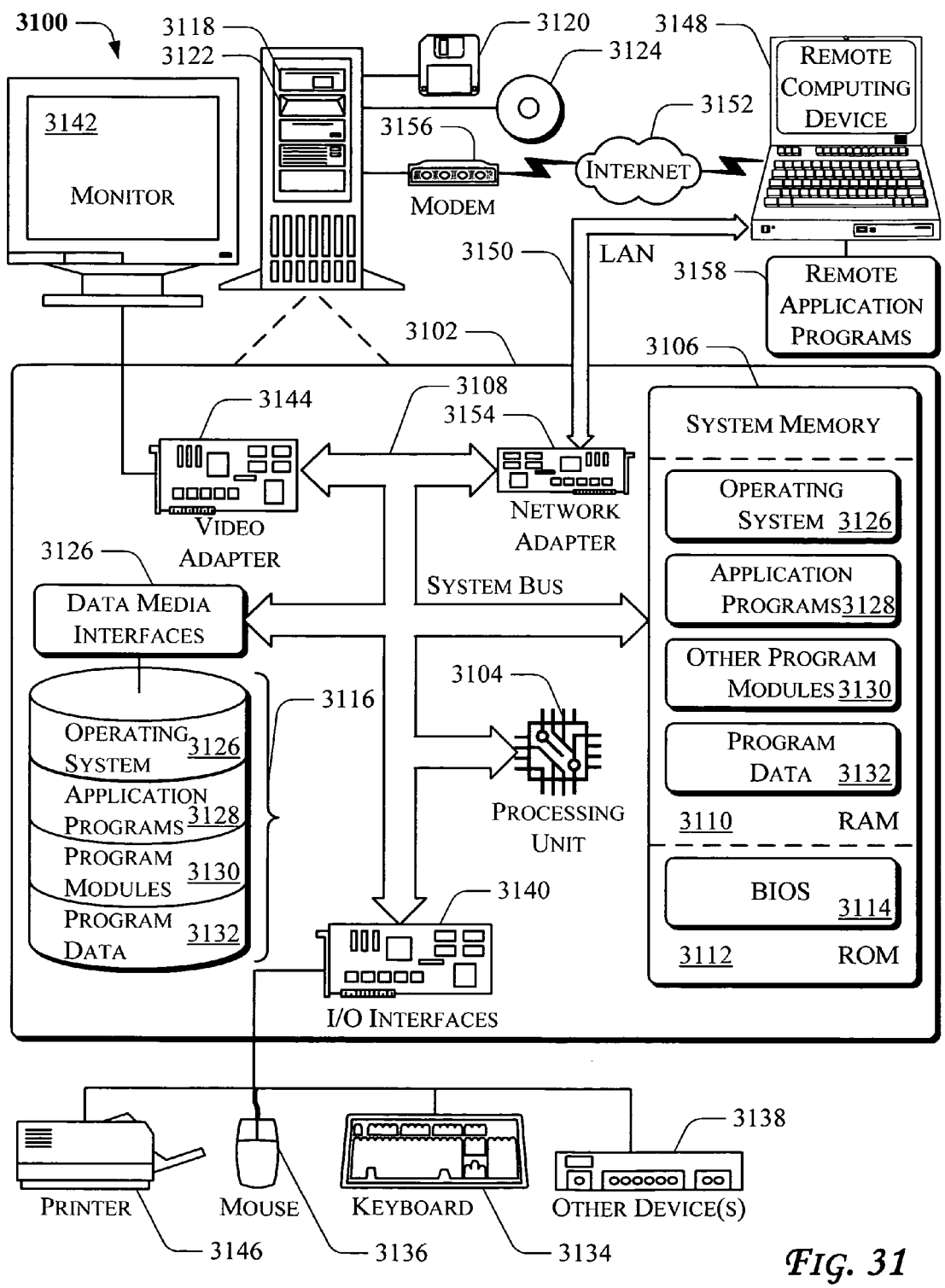

FIG. 31 illustrates a general computer environment, which can be used to implement the techniques described herein.

DETAILED DESCRIPTION

The following disclosure describes techniques for improving the quality of images that may be blurred or underexposed (e.g., because of dimly lit conditions, presence of high action scenes, or camera shake). Two pictures are taken of a same scene with different exposure intervals. Hence, one image can be underexposed and the other can be blurred. The information within these two images is used to provide a high-quality image of the scene without visible blurring or darkness. The two pictures may be taken within a short interval, for example, to ensure that the center of the images do not move significantly or to limit the affects of motion by the camera or movement of objects within the scene. The techniques may be readily extended to handle high contrast scenes to reveal fine details in saturated regions (as will be discussed with reference to FIGS. 22-25).

Furthermore, some of the techniques may be directly incorporated into a digital camera. For example, a digital camera may be configured to keep its shutter open while taking the two pictures (as will be further discussed with reference to FIGS. 29-30).

Overview

Figure 1:
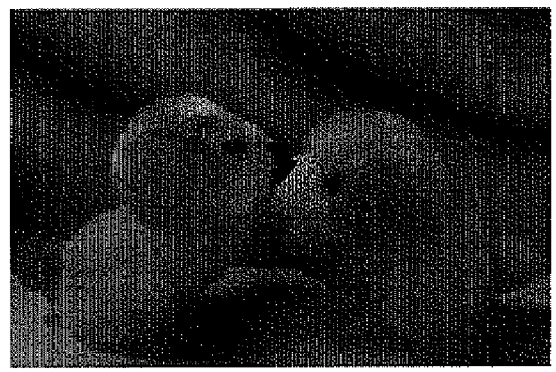
FIGS. 1 and 2 illustrate images taken of a same scene under dim lighting conditions.
Figure 2:
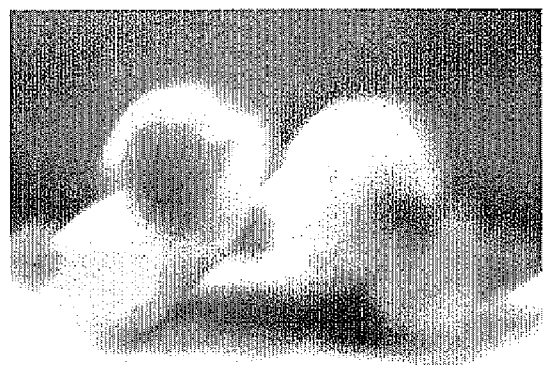
Figure 3:
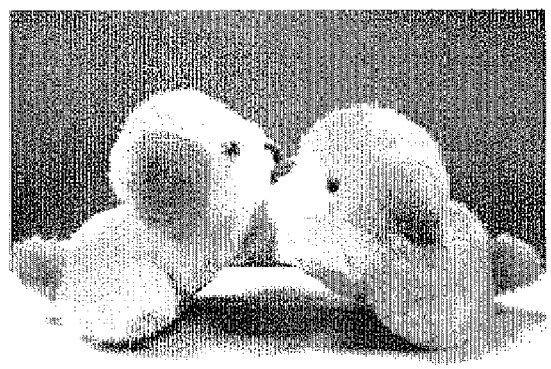
FIG. 3 illustrates an exemplary high-quality image where luminance correction is applied.

FIGS. 1 and 2 illustrate images taken of a same scene under dim lighting conditions. As illustrated, the image of FIG. 1 ($I_L$) is underexposed and the image of FIG. 2 ($I_H$) is blurred. The images of FIGS. 1 and 2 have different exposure intervals. As illustrated, the image of FIG. 1 ($I_L$) has a longer exposure time than the image of FIG. 2 ($I_H$) Techniques discussed herein can utilize the images shown in FIGS. 1 and 2 to construct a high-quality image ($I_C$) such as shown in FIG. 3.

Image Acquisition

In one implementation, to exploit the tradeoff between the exposure time and the blurring degree of the captured images, the two input images may be taken using the same capture device (e.g., a camera) with the following exposure settings:

One image (e.g., $I_L$ of FIG. 1) is taken with exposure time around the safe shutter speed, producing an underexposed image where motion blur is largely reduced. Since this image ($I_L$) is too dark, the colors in the image are not acceptable.

The other image (e.g., $I_H$ of FIG. 2) is an image acquired under an extended exposure time. The color and brightness of this image is acceptable. However, it is motion blurred because of camera shaking or moving objects in the scene.

In situations where movement of the scene (or objects within the scene) and/or capturing device (e.g., handheld camera without a tripod) is possible, the two pictures may be taken within a short interval. If the time lapse is kept as short as possible, the differences between the two images are minimized and/or the regional match of the positions of each pixel is maximized.

Luminance Correction

Figure 4:
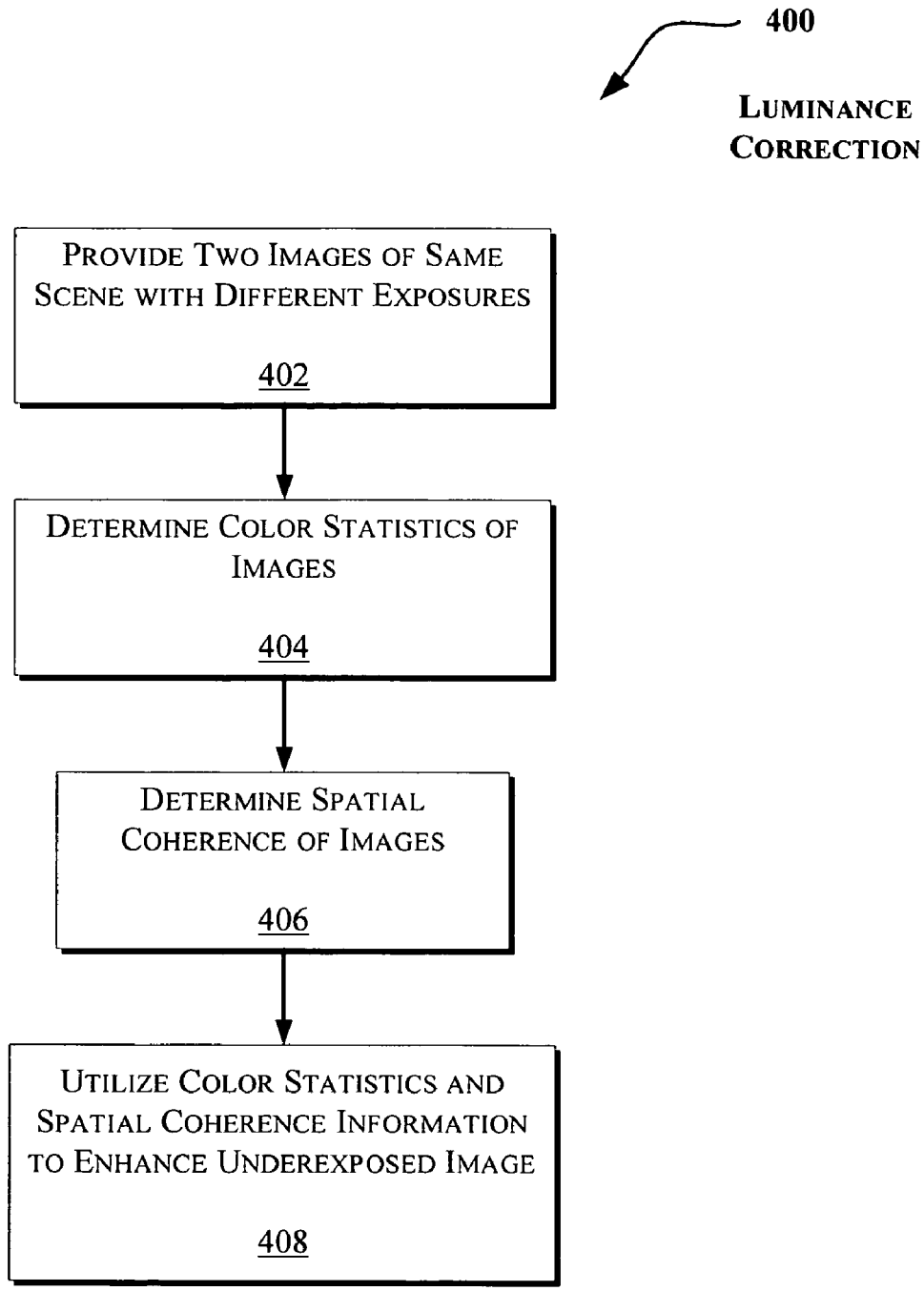
FIG. 4 illustrates an exemplary method for luminance correction.

FIG. 4 illustrates an exemplary method 400 for luminance correction. After two images of the same scene are provided (402), such as discussed with reference to FIGS. 1-2 (e.g., $I_L$ and $I_H$), the color statistics (404) and spatial coherence (406) of the images are determined (as will be described in more detail below in sections with similar titles). As discussed with reference to FIGS. 1-2, $I_L$ and $I_H$ are two images of the same scene with different exposure intervals. Therefore, they are related not only by the color statistics, but also by the corresponding spatial coherence.

The color statistics and spatial coherence information is utilized (408) to enhance the underexposed image (e.g., $I_L$ of FIG. 1) in color space to provide a normally exposed high quality image (e.g., $I_C$ of FIG. 3). More specifically, the stage 408 utilizes a color mapping approach in one implementation. The color mapping is constrained by spatial details determined from the underexposed image and, thus, differs from and improves on previous pure color transfer techniques. As will be further discussed in more detail below, by properly formulating color statistics and spatial constraints, and incorporating them into a Bayesian framework, a maximum a posterior (MAP) solution provides an optimal color mapping function in the color space that preserves structural details while enhancing pixel colors simultaneously.

Furthermore, the method 400 can deal with camera shake and object movement at the same time, and in a unified framework. Moreover, change of object topology or object deformation can also be handled, which is difficult for most deblurring methods, since different parts of the object have different PSFs. In addition, by slightly modifying one constraint (as will be further discussed under "color statistics in high contrast scenes"), the method 400 can be extended to deal with high contrast scenes and produce images with captured fine details in highlight or saturated areas.

Relationship Between $I_L$ and $I_H$

As discussed with reference to FIGS. 1-2, $I_L$ and $I_H$ are two images of the same scene with different exposure intervals. Therefore, they are related not only by the color statistics, but also by the corresponding spatial coherence. Their relationship may be translated into constraints for inferring a color mapping function in a Bayesian framework.

In an implementation, the underexposed image $I_L$ can be regarded as a sensing component in normally exposed image $I_H$ in the temporal coordinates. This makes it possible to reasonably model the camera or scene (or scene object) movement during the exposure time, and constrain the mapping process which will be further described in the next sections.

Color Statistics

In RGB (red, green, and blue) color space, important color statistics can often be revealed through the shape of a color histogram. A histogram is generally a representation of a frequency distribution by means of rectangles or bars whose widths represent class intervals and whose areas are proportional to the corresponding frequencies. Thus, the histogram can be used to establish an explicate connection between $I_H$ and $I_L$. Moreover, since high irradiance generates brighter pixels, the color statistics in $I_L$ and $I_H$ can be matched in order from lower to higher in pixel intensity values. Accordingly, the histogram of $I_L$ ($h_{I_L}$) may be reshaped such that:

$$g(h_{I_L}) \doteq h_{I_H} \qquad (1)$$

In (1), $g(\bullet)$ is the transformation function performed on each color value in the histogram, and $h_{I_H}$ is the histogram of $I_H$. A common way to estimate $g(\bullet)$ is adaptive histogram equalization, which normally modifies the dynamic range and contrasts of a image according to a destination curve.

This histogram equalization may not produce satisfactory results in some situations though. More specifically, the quantized 256 (single byte accuracy) colors in each channel may not be sufficient to accurately model the variety of histogram shapes.

Figure 5:
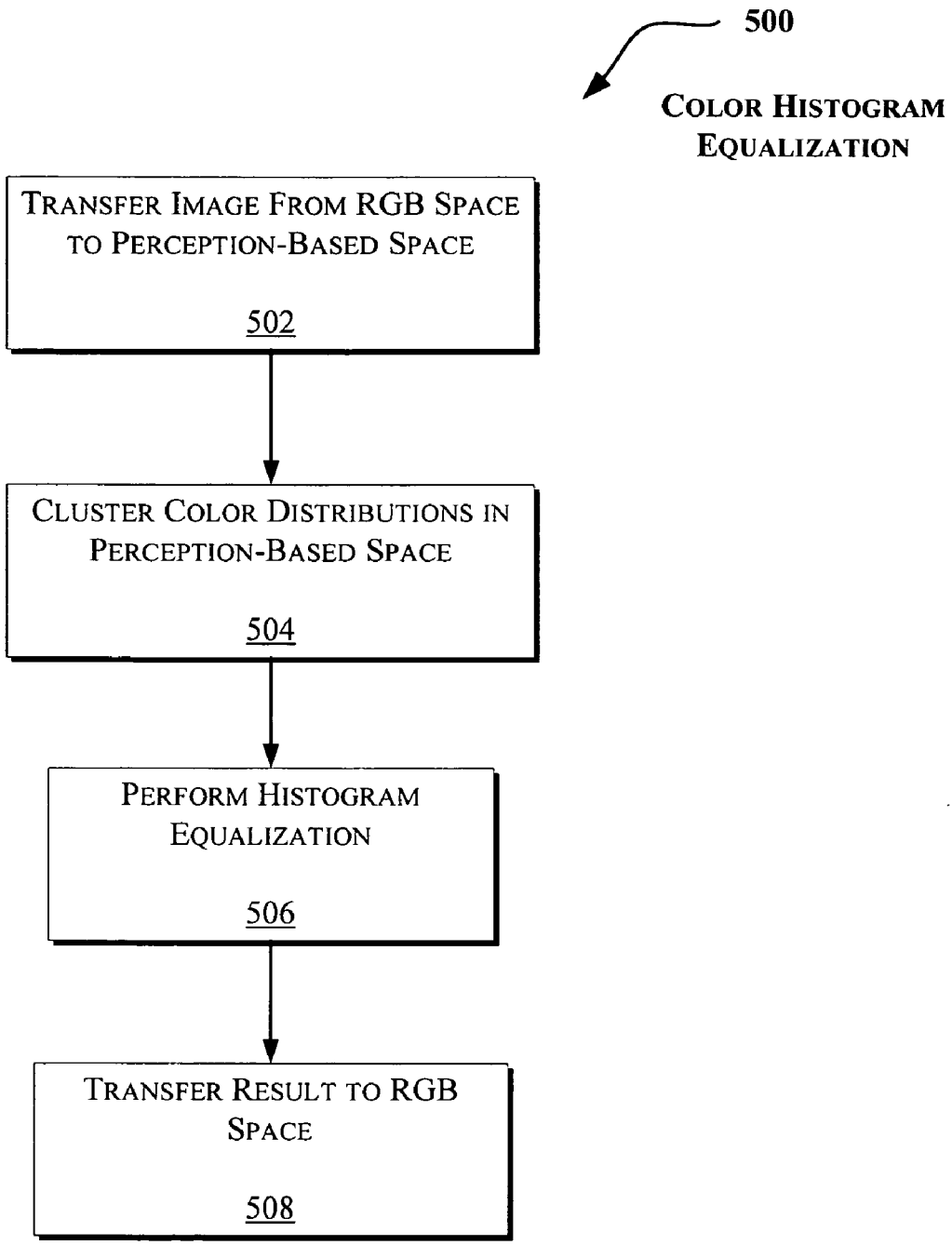
FIG. 5 illustrates an exemplary method for color histogram equalization which may be utilized in luminance correction.

FIG. 5 illustrates an exemplary method 500 for color histogram equalization which may be utilized in luminance correction. More specifically, the method 500 may be utilized to optimally estimate the transformation function. First, the image from RGB space is transferred to a perception-based color space lαβ (502), where the l is the achromatic channel, and α and β contain the chromaticity value. In this way, the image is transformed to a more discrete space with known phosphor chromaticity.

The color distributions in the new color space are clustered into 65,536 (double byte precision) portions (504). Histogram equalization is then performed in the new color space (506). The result of the histogram equalization (506) is transferred back to the RGB space (508).

Figure 8:
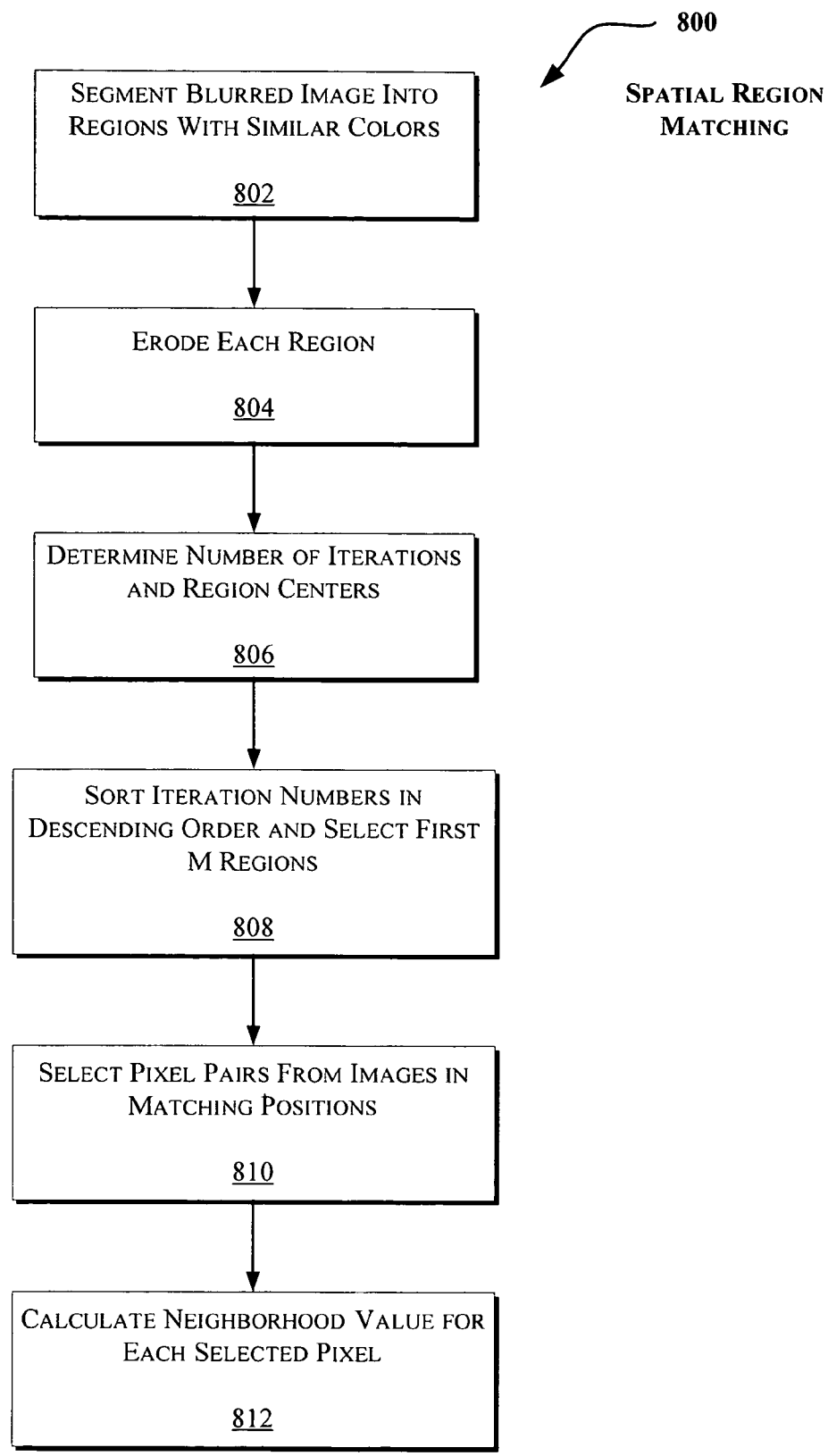
FIG. 8 illustrates an exemplary spatial region matching method which may be utilized in luminance correction.
Figures 9, 10, 11:
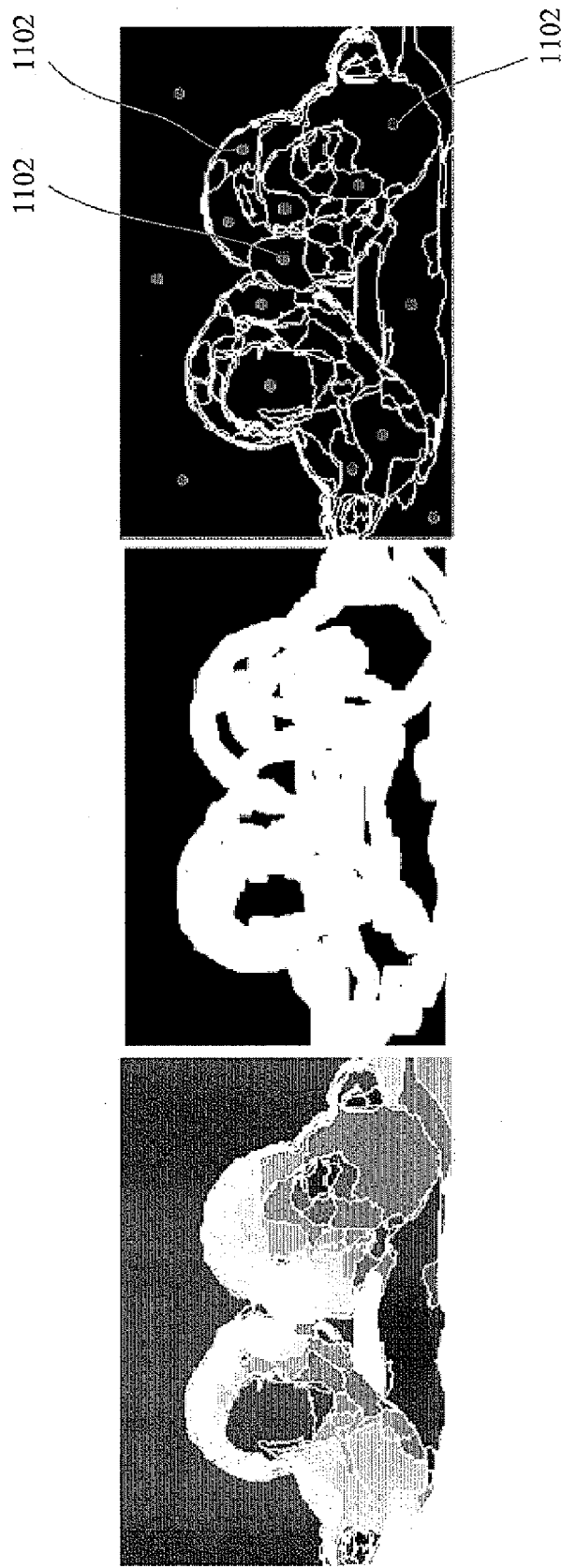
FIG. 9 illustrates a sample segmentation of the image of FIG. 2 into regions.
FIG. 10 illustrates an exemplary intermediate image resulting from eroding the regions within the image of FIG. 9.
FIG. 11 illustrates the selected region centers of FIGS. 9 and 10 as dots.

FIG. 8 illustrates an exemplary spatial region matching method 800 which may be utilized in luminance correction. The method 800 may be used to select matching seeds in $I_H$ and $I_L$. The blurred image (e.g., $I_H$ of FIG. 2) is segmented into regions such that each region $R_m$ ($I_H$) contains similar colors (802). A sample segmentation of FIG. 2 into regions is shown in FIG. 9.

To sort the regions according to the homogeneity and size, each region $R_m$ ($I_H$) is eroded (804) and the number of iterations to completely erode each region and the region centers which are the last few pixels in the eroding process for each region are determined (806). The same morphological eroding operation may be performed for each region $R_m$ ($I_H$) in one implementation. FIG. 10 illustrates an exemplary intermediate image resulting from eroding the regions within the image of FIG. 9.

The iteration numbers are sorted in descending order and the first M regions are selected as the most possible candidates for region matching (808). As a result, the positions of these region centers are selected as matching positions. From the images $I_H$ and $I_L$, pixel pairs $\{c_L^m, c_H^m\}$ in the matching position are selected (810) and the value for each $c^m$ is calculated as a Gaussian average of the colors of neighboring pixels (812), where the variance is proportional to the iteration numbers. The selected region centers are illustrated in FIG. 11 as dots (1102). As illustrated, the dots (1102) are located in the largest and most homogeneous M regions.

By performing this transformed histogram equalization on the two images (e.g., FIGS. 1-2), the two images may be related entirely in their color space. However, the color statistics is largely dependent on the image quality of the camera. For example, if the darker image contains a large amount of noise, the contaminated information may need to be treated first (e.g., by filtering the image).

Spatial Constraint

The color statistics described above does not consider any temporal coherence between $I_H$ and $I_L$. However, since the two images are taken of the same scene, there is a strong spatial constraint between $I_H$ and $I_L$.

In a situation where a region contains similar color pixels, FIG. 6A shows a homogeneous region from the original image, while FIG. 6B shows the same region taken with motion blur. The dots 602 mark the region centers. The corresponding curves of FIGS. 7A and 7B illustrate pixel colors along one direction. From FIGS. 6A, 6B, 7A, and 7B, it can be observed that the color toward the center of the region is less affected by blurring, given that the region area is sufficiently large and homogeneous. Additionally, the consistency of colors in the region allows matching of the color of central pixels.

The matching process (800) implies that an ideal color mapping function should be able to transform some matching seeds colors in $I_L$ to those in $I_H$. In the next section, a Bayesian framework is described which incorporates the two constraints (color and spatial) into consideration, so as to infer a constrained mapping function.

Constrained Mapping Function

The color mapping function may be defined as $f(l_i)=l_i'$, where $l_i$ and $l_i'$ are color values in two sets, respectively. Accordingly, the resulting image $I_C$ is built by applying $f(\bullet)$ to the underexposed image $I_L: I_C(x, y) = f(I_L(x, y))$, where $I_k(x, y)$ is pixel values in image $I_k$. Note that the form of $f(\bullet)$ is constrained by both $I_L$ and $I_H$.

In Bayesian framework, one maximizes the a posterior probability (MAP) to infer $f^*$ given the observations from $I_L$ and $I_H$:

$$f* = \arg\max_f \; p(f \mid I_L, I_H) \qquad (2)$$

In the previous sections, two kinds of connections between $I_L$ and $I_H$ were observed. One is color statistics which can be described by two histograms $h_{I_L}$ and $h_{I_H}$ of $I_L$ and $I_H$, respectively. The other is the region matching constraint which can be represented by a number of M corresponding matching color seeds $\{c_L^m, c_H^m\}_{m=1}^M$ between $I_L$ and $I_H$. These relationships may be regarded as constraints and equation (2) may be rewritten as:

$$f* = \arg\max_f \; p(f \mid h_{I_L}, h_{I_H}, \{c_L^m, c_H^m\}_{m=1}^M) \qquad (3)$$

$$= \arg\max_f \; p(h_{I_L}, h_{I_H}, \{c_L^m, c_H^m\}_{m=1}^M \mid f) p(f)$$

The next sections defines the likelihood $$p(h_{I_L}, h_{I_H}, \{c_L^m, c_H^m\}_{m=1}^M \mid f)$$

and the prior $p(f)$.

Likelihood

Since global matching is performed in a discrete color space, $f$ is approximated by a set of discrete values $f=\{f1, f2, \ldots, f, \ldots, fN\}$, where N is the total number of bins in the color space. Hence, the likelihood in equation (3) can be factorized under the independent and identically distributed (IID) assumption:

$$p(h_{I_L}, h_{I_H}, \{c_L^m, c_H^m\}_{m=1}^M \mid f) = \prod_{i=1}^N p(g(l_i), \{c_L^{-i}, c_H^{-i}\} \mid f_i) \qquad (4)$$

In equation (4), $g(l_i)$ is a function to transform $h_{I_L}$ to $h_{I_H}$ at color value $l_i$. The $c_L^{-i}$ is the most similar color to $l_i$ in color seeds set $$\{c_L^m\}_{m=1}^M,$$

and $c_H^{-i}$ is the corresponding color of $c_L^{-i}$ in color seed pairs.

According to the analysis in the previous sections, $g(l_i)$ and $\{c_L^{-i}, c_H^{-i}\}$ are two constraint factors for each $f_i$. Both of their properties should be maintained on the mapping function. As a consequence, the two constraints may be balanced and the likelihood may be modeled as follows:

$$p(g(l_i), \{c_L^{-i}, c_H^{-i}\} \mid f_i) \propto \exp\left(-\frac{\|f_i - (\alpha g(l_i) + (1-\alpha) c_H^{-i})\|^2}{2\sigma_l^2}\right) \qquad (5)$$

In equation (5), the scale $\alpha$ weights the two constraints, and $\sigma_l^2$ is a variance to model the uncertainty of the two kinds of constraints. As the value of $\alpha$ grows, the confidence of the matching seed pairs drops. The $\alpha$ may be related to the following factors:

The distance $\|l_i - c_L^{-i}\|$. A large distance indicates a weak region matching constraint, which makes $\alpha$ approach 1. Hence, the $\alpha$ is inversely proportional to this distance.

The uncertainty of correspondence in matching color pair $\{c_L^{-i}, c_H^{-i}\}$. As depicted in the previous sections, the larger the matching region size is, the larger confidence one can get from the region center for the matching colors. Hence, the uncertainty $\sigma_c$ may be defined to be proportional to the region size for each matching color. Combining these two factors, the $\alpha$ may be defined as:

$$\alpha = \exp\left(\frac{\sigma_c^2 \|l_i - c_L^{-i}\|^2}{2\beta^2}\right) \qquad (6)$$

In equation (6), $\beta$ is the scale parameter to control the influence of $\alpha$.

Prior

As a prior, the monotonic constraint may be enforced on $f(\cdot)$, which maintains the structural details in $I_L$. In addition, to avoid abrupt change of the color mapping for neighboring colors, it may be required that $f(\cdot)$ be smooth in its shape in an implementation. In another implementation, the second derivative of $f$ may be minimized as follows:

$$p(f) \propto \exp\left(-\frac{1}{2\sigma_f^2} \int (f'')^2\right) \qquad (7)$$

$$\propto \exp\left(-\frac{1}{2\sigma_f^2} \sum_i (f_{i-1} - 2f_i + f_{i+1})^2\right)$$

In equation (7), the $\sigma_f^2$ is the variance to control the smoothness of $f$.

Map Solution

Combining the log likelihood of equation (4) and the log prior in equation (7), the optimization problem may be solved by minimizing the following log posterior function:

$$E(f) = -\sum_i \log p(g(l_i), \{c_L^{-i}, c_H^{-i}\} \mid f_i) - \log p(f) \qquad (8)$$

In equation (8), the $E(f)$ is a quadratic objective function. Therefore, the global optimal mapping function $f(\cdot)$ can be obtained by the singular value decomposition (SVD). Although the monotonic constraint is not enforced explicitly in equation (7), the smoothness constraint is sufficient to construct the final monotonic $f$ in an implementation.

Other Sample Results

Figure 12:
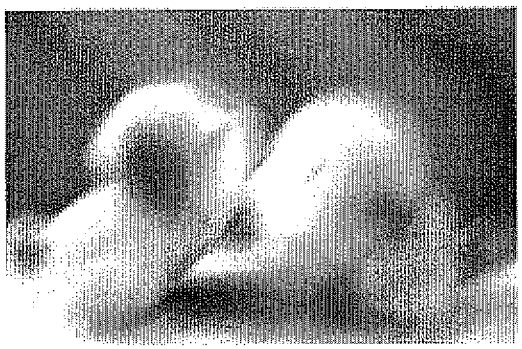
FIG. 12 illustrates a sample input underexposed image.
Figure 13:
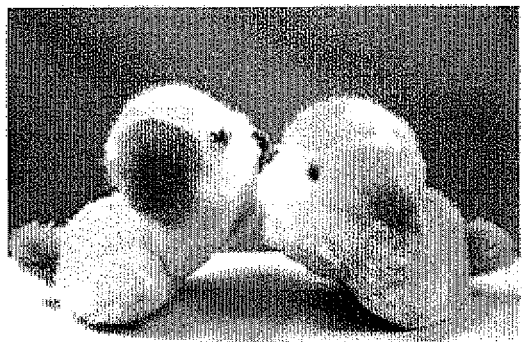
FIG. 13 illustrates an exemplary image resulting from application of luminance correction to the image of FIG. 12.
Figure 14:
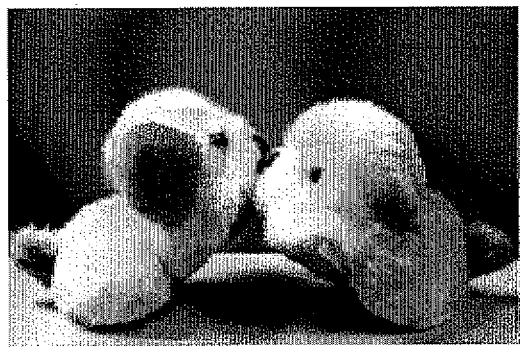
FIG. 14 illustrates an exemplary result when applying color transfer techniques to the image of FIG. 12.
Figure 15:
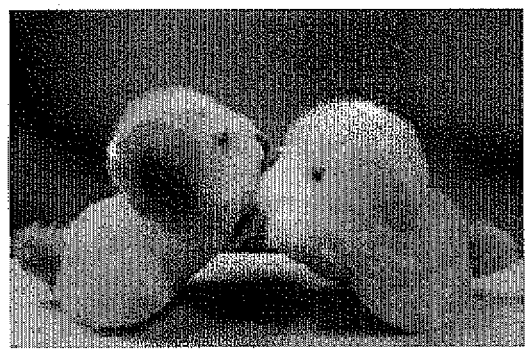
FIG. 15 illustrates an exemplary result with adaptive histogram equalization applied to the image of FIG. 12.
Figure 16:
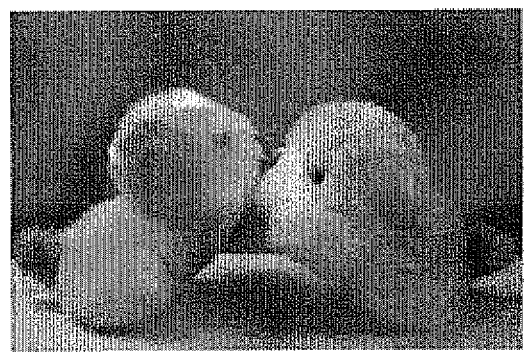
FIG. 16 illustrates an exemplary result when Gamma correction of 2.5 is applied to the image of FIG. 12.
Figure 17:
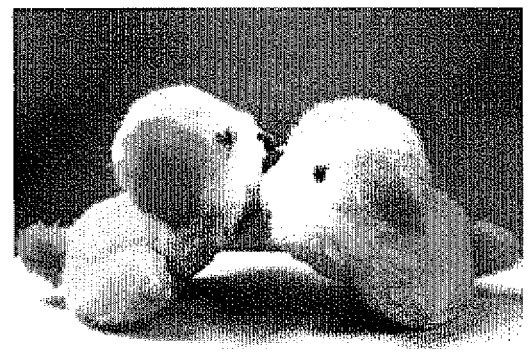
FIG. 17 illustrates an exemplary result with curve adjustment applied to the image of FIG. 12 in a photo editing program.

The techniques described herein are applied to difficult scenarios to show the efficacy of the approach. The results are classified into different groups as follows: FIG. 12 illustrates a sample input underexposed image; FIG. 13 illustrates an exemplary image resulting from application of the luminance correction of the present application to the image of FIG. 12; FIG. 14 illustrates an exemplary result when applying color transfer techniques; FIG. 15 illustrates an exemplary result with adaptive histogram equalization; FIG. 16 illustrates an exemplary result when Gamma correction of 2.5 is applied; and FIG. 17 illustrates an exemplary result with curve adjustment applied in a photo editing program. As can be seen, better visual quality and more details are achieved by using the constraints described herein (i.e., FIG. 13).

Also, the two constraints described herein (spatial and color) are both beneficial in an implementation. They optimize the solution in two different aspects. Therefore, the combination and balance of these constraints may guarantee the visual correctness of the methodology described herein in one implementation.

Motion Blur Caused by Hand-Held Camera

The rock example of FIGS. 18-21 illustrates the ability of the methodologies described herein to optimally combine the color information of the two input images (i.e., those of FIGS. 18 and 19). The histogram of each image is shown the lower left side of each figure. Unlike other deblurring methods, the resulting edges are crisp and clear. The two input images are taken with shutter speeds 1/40 s and 1/3 s, respectively. FIGS. 20 and 21 are the color mapped image ($I_C$) and ground truth with their corresponding histograms, respectively. The ground truth image (FIG. 21) is taken by using a tripod. Note that the images are visually and statistically close in FIGS. 20 and 21.

Motion Blur Caused by Movement of Objects

Figures 22, 23, 24:
FIGS. 22-24 illustrate results of an experiment with motion blur caused by movement of objects within a scene.

In an implementation, the techniques discussed herein can easily solve object movement or deformation problems (e.g., if the object movement is too fast in normal exposure interval). FIGS. 22-24 illustrate results of an experiment. As illustrated, portions of FIGS. 23 and 24 are enlarged for ease of reference. The input normal exposure image is locally blurred (FIG. 23), i.e., PSF has no uniform representation in the whole image, which easily makes deconvolving methods fail. Using the techniques discussed herein (and the underexposed image of FIG. 22), the camera shutter speed may be reduced by four stops. As a result, a high quality image ($I_C$) with largely reduced blurring effect can be generated (FIG. 24).

Color Statistics in High Contrast Scenes

Where the images are taken of a high contrast scene, bright regions will become saturated in $I_H$. Histogram equalization faithfully transfers colors from $I_L$ to $I_H$, including the saturated area, which not only degrades the spatial detail in the highlight region, but also generates abrupt changes in the image color space.

To solve this problem, the color mapping function g(•) described in the previous sections may be modified to cover a larger range. In one implementation, a color transfer technique may be utilized to improve the image quality in high contrast situations. This technique also operates on an image histogram, which transfers the color from the source image to the target by matching the mean and standard deviation for each channel. It has no limit on the maximum value of the transferred color since the process is a Gaussian matching.

In an implementation, all non-saturated pixels in $I_H$ are used for color transfer to $I_L$. After applying the color transfer technique, the mapping result of $I_L$ exceeds the color depth (that is, above 255), and extends the saturated pixels to larger color values. Hence, a higher range image is constructed to reveal details in both bright and dark regions.

Sample images associated with such an implementation are shown in FIGS. 25-28. As illustrated, portions of FIGS. 25-28 are enlarged for ease of reference. FIGS. 25 and 26 illustrate the input images ($I_H$ and $I_L$, respectively). The image of FIG. 27 is reconstructed by setting g(•) as the original histogram equalization function. FIG. 28 is a result with enhanced colors and details by modifying g(•) to use the color transfer method. Tone mapping is also performed to present the image illustrated in FIG. 28.

Hardware Implementation

One hardware implementation may include a digital camera that is connected to a general-purpose computer. Capturing of the two images with different shutter speeds (such as those discussed with reference to FIGS. 1 and 2) may be controlled by the corresponding camera software running on the computer. This setup may free the photographer from manually changing the camera parameters between shots to enable the photographer to focus on shooting the best pictures. Alternatively, the software may be implemented inside the camera (or in a memory device attached to the camera such as flash memory). The functionality incorporated into the camera may be implemented as software, hardware, firmware, or combinations thereof.

Some cameras already include exposure bracketing (e.g., Canon G-model and some Nikon Coolpix model digital cameras) which takes multiple pictures at different shutter speeds by pressing the shutter button a single time. However, using the present built-in camera functionality has some limitations. Namely, it does not operate in manual mode, and the difference of shutter speeds is limited.

FIG. 29 illustrates an exemplary digital camera configuration 2900 for taking multiple shoots at a time that may be utilized to provide luminance correction. The camera may be a stand-alone camera or a camera incorporated into another device (such as a personal digital assistant (PDA), a cell phone, and the like). The configuration 2900 includes a shutter 2902 which is exposed to light rays. When the shutter 2902 opens (e.g., upon pressing a button on the camera), the shutter 2902 passes the light rays to a sensor 2904 (e.g., a CMOS or a charge coupled device (CCD)). Two pictures may be taken by the camera by pressing a shutter button a single time. Luminance correction may then be applied to the pictures as discussed herein.

In one implementation, the presence of the shutter 2902 may be optional. For example, the sensor 2904 may be activated (e.g., powered) as needed without requiring a physical barrier (such as the shutter 2902). Moreover, a more simplified mechanism (such as a sensor cover) may be utilized to protect the sensor 2904 from environmental elements (e.g., strong sun rays, dust, water, humidity, and the like).

As illustrated in FIG. 29, a graph 2906 indicates how photon energy captured by the sensor 2904 may increase over time (e.g., from T1 to T2). For example, at time T1, the sensor image may be underexposed in dim lighting conditions (as discussed with reference to FIG. 1). Also, at time T2 (e.g., ½ second after time T1), the sensor image may be blurred (e.g., due to motion by camera, objects within the scene, etc.) as discussed with reference to FIG. 2. This difference in the exposure may be used in one implementation to provide software exposure (rather than a mechanical exposure mechanism) as will be further discussed with reference to FIG. 30.

In one implementation, the software for performing luminance correction may be provided through a general-purpose computer (such as that discussed with reference to FIG. 31). The computer may be directly coupled to the camera or a memory card from the camera may be later linked to the computer to make the images available for processing. Alternatively, the software may be implemented inside the camera (or in a memory device attached to the camera such as flash memory). Moreover, the functionality incorporated into the camera may be implemented as software, hardware, firmware, or combinations thereof.

Software Exposure Implementation

FIG. 30 illustrates an exemplary method 3000 for controlling camera exposure via software (e.g., instead of controlling the camera shutter). The method 3000 may be implemented as software, hardware, firmware, or combinations thereof within a digital camera such as that discussed with reference to FIG. 29.

Upon receiving a command to capture images (3002), e.g., by pressing a button on a stand-alone digital camera or a camera incorporated into another device (such as a PDA, a cell phone, and the like), the camera shutter (e.g., 2902) is opened (3004). A first image may be captured at a time T1 (3006). The time T1 may be that discussed with reference to graph 2906 of FIG. 29. Accordingly, the first image may be underexposed (e.g., $I_L$ of FIG. 1).

Without closing the shutter, a second image is captured at a time T2 (3008). The time T2 may be that discussed with reference to graph 2906 of FIG. 29. Accordingly, the second image may be blurred (e.g., $I_H$ of FIG. 2).

Luminance correction is then applied to the captured images (3010) such as discussed herein to provide a high quality image (e.g., $I_C$ of FIG. 3).

Accordingly, as the shutter is left open, both an underexposed and a blurred image maybe captured in accordance with method 3000. Such an implementation may ensure that any motion (e.g., from camera or objects within the scene) is limited.

General Computer Environment

FIG. 31 illustrates a general computer environment 3100, which can be used to implement the techniques described herein. For example, the computer environment 3100 may be utilized to run the software program that controls an image capture device (such as a camera). The computer environment 3100 is only one example of a computing environment and is not intended to suggest any limitation as to the scope of use or functionality of the computer and network architectures. Neither should the computer environment 3100 be interpreted as having any dependency or requirement relating to any one or a combination of components illustrated in the exemplary computer environment 3100.

Computer environment 3100 includes a general-purpose computing device in the form of a computer 3102. The components of computer 3102 can include, but are not limited to, one or more processors or processing units 3104 (optionally including a cryptographic processor or co-processor), a system memory 3106, and a system bus 3108 that couples various system components including the processor 3104 to the system memory 3106.

The system bus 3108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 3102 typically includes a variety of computer-readable media. Such media can be any available media that is accessible by computer 3102 and includes both volatile and non-volatile media, removable and non-removable media.

The system memory 3106 includes computer-readable media in the form of volatile memory, such as random access memory (RAM) 3110, and/or non-volatile memory, such as read only memory (ROM) 3112. A basic input/output system (BIOS) 3114, containing the basic routines that help to transfer information between elements within computer 3102, such as during start-up, is stored in ROM 3112. RAM 3110 typically contains data and/or program modules that are immediately accessible to and/or presently operated on by the processing unit 3104.

Computer 3102 may also include other removable/non-removable, volatile/non-volatile computer storage media. By way of example, FIG. 31 illustrates a hard disk drive 3116 for reading from and writing to a non-removable, non-volatile magnetic media (not shown), a magnetic disk drive 3118 for reading from and writing to a removable, non-volatile magnetic disk 3120 (e.g., a "floppy disk"), and an optical disk drive 3122 for reading from and/or writing to a removable, non-volatile optical disk 3124 such as a CD-ROM, DVD-ROM, or other optical media. The hard disk drive 3116, magnetic disk drive 3118, and optical disk drive 3122 are each connected to the system bus 3108 by one or more data media interfaces 3126. Alternatively, the hard disk drive 3116, magnetic disk drive 3118, and optical disk drive 3122 can be connected to the system bus 3108 by one or more interfaces (not shown).

The disk drives and their associated computer-readable media provide non-volatile storage of computer-readable instructions, data structures, program modules, and other data for computer 3102. Although the example illustrates a hard disk 3116, a removable magnetic disk 3120, and a removable optical disk 3124, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 3116, magnetic disk 3120, optical disk 3124, ROM 3112, and/or RAM 3110, including by way of example, an operating system 3126, one or more application programs 3128, other program modules 3130, and program data 3132. Each of such operating system 3126, one or more application programs 3128, other program modules 3130, and program data 3132 (or some combination thereof) may implement all or part of the resident components that support the distributed file system.

A user can enter commands and information into computer 3102 via input devices such as a keyboard 3134 and a pointing device 3136 (e.g., a "mouse"). Other input devices 3138 (not shown specifically) may include a microphone, joystick, game pad, satellite dish, serial port, scanner, and/or the like. These and other input devices are connected to the processing unit 3104 via input/output interfaces 3140 that are coupled to the system bus 3108, but may be connected by other interface and bus structures, such as a parallel port, game port, or a universal serial bus (USB). The USB port may be utilized to connect a camera or a flash card reader (such as discussed with reference to FIG. 29) to the computer environment 3100.

A monitor 3142 or other type of display device can also be connected to the system bus 3108 via an interface, such as a video adapter 3144. In addition to the monitor 3142, other output peripheral devices can include components such as speakers (not shown) and a printer 3146 which can be connected to computer 3102 via the input/output interfaces 3140.

Computer 3102 can operate in a networked environment using logical connections to one or more remote computers, such as a remote computing device 3148. By way of example, the remote computing device 3148 can be a personal computer, portable computer, a server, a router, a network computer, a peer device or other common network node, game console, and the like. The remote computing device 3148 is illustrated as a portable computer that can include many or all of the elements and features described herein relative to computer 3102.

Logical connections between computer 3102 and the remote computer 3148 are depicted as a local area network (LAN) 3150 and a general wide area network (WAN) 3152. Such networking environments are commonplace in offices, enterprise-wide computer networks, intranets, and the Internet.

When implemented in a LAN networking environment, the computer 3102 is connected to a local network 3150 via a network interface or adapter 3154. When implemented in a WAN networking environment, the computer 3102 typically includes a modem 3156 or other means for establishing communications over the wide network 3152. The modem 3156, which can be internal or external to computer 3102, can be connected to the system bus 3108 via the input/output interfaces 3140 or other appropriate mechanisms. It is to be appreciated that the illustrated network connections are exemplary and that other means of establishing communication link(s) between the computers 3102 and 3148 can be employed.

In a networked environment, such as that illustrated with computing environment 3100, program modules depicted relative to the computer 3102, or portions thereof, may be stored in a remote memory storage device. By way of example, remote application programs 3158 reside on a memory device of remote computer 3148. For purposes of illustration, application programs and other executable program components such as the operating system are illustrated herein as discrete blocks, although it is recognized that such programs and components reside at various times in different storage components of the computing device 3102, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may include "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. For example, the luminance correction techniques discussed herein may be readily applied to non-color images (e.g., grayscale images).

What is claimed is:

1. A method of luminance correction comprising:
   providing two images of a same scene;
   determining a spatial coherence and color statistics of the two images, wherein the determining the spatial coherence comprises utilizing spatial region matching, wherein the spatial region matching comprises:
      segmenting a blurred one of the two images into a plurality of similarly colored regions;
      eroding each of the regions;
      determining a number of iterations to completely erode each region;
      determining a region center for each of the regions;
      sorting the iteration numbers in descending order;
      selecting pixel pairs from the images in matching positions; and
      calculating a neighborhood value for each selected pixel; and
   utilizing the determined color statistics and spatial coherence to enhance one of the two images.

2. A method as recited in claim 1, wherein the images are taken in a dim lighting condition.

3. A method as recited in claim 1, wherein one of the two images is underexposed.

4. A method as recited in claim 1, wherein one of the two images is blurred.

5. A method as recited in claim 1, wherein an underexposed one of the two images is enhanced.

6. A method as recited in claim 1, wherein the two images are related by the color statistics and the spatial coherence.

7. A method as recited in claim 1, further comprising downloading the two images to a general-purpose computer, the general-purpose enhancing one of the two images.

8. A method as recited in claim 1, further comprising downloading the two images to a general-purpose computer, the general-purpose determining one or more of the color statistics and spatial coherence.

9. A method as recited in claim 1, further comprising modifying a color mapping function of the two images to cover a larger range for a high contrast scene.

10. A method as recited in claim 1, further comprising utilizing color histogram equalization to determine the color statistics.

11. A method as recited in claim 1, further comprising utilizing color histogram equalization to determine the color statistics, wherein the color histogram equalization comprises:
   transferring the two images to a perception-based color space;
   clustering color distributions in the perception-based space;
   performing histogram equalization in the perception-based space; and
   transferring a result of the histogram equalization to a red-green-blue space.

12. A method as recited in claim 1, further comprising using an exposure bracketing feature of a digital camera to provide the two images.

13. A method as recited in claim 1, wherein the method is performed by a digital camera.

14. One or more computer readable media storing computer executable instructions that, when executed, perform the method as recited in claim 1, wherein the one or more computer readable media are incorporated inside a digital camera.

15. A method of luminance correction comprising:
   providing an underexposed image of a scene;
   providing a blurred image of the same scene;
   determining a spatial coherence and color statistics of the images, wherein the determining the spatial coherence comprises utilizing spatial region matching, wherein the spatial region matching comprises:
      segmenting the blurred image into a plurality of similarly colored regions;
      eroding each of the regions;
      determining a number of iterations to completely erode each region;
      determining a region center for each of the regions;
      sorting the iteration numbers in descending order;
      selecting pixel flairs from the images in matching positions; and
      calculating a neighborhood value for each selected pixel; and
   utilizing the determined color statistics and spatial coherence to enhance the underexposed image.

16. A method as recited in claim 15, wherein the images are taken in a dim lighting condition.

17. A method as recited in claim 15, wherein the images are taken successively in a short interval.

18. A method as recited in claim 15, further comprising utilizing color histogram equalization to determine the color statistics.

19. A method as recited in claim 15, further comprising utilizing color histogram equalization to determine the color statistics, wherein the color histogram equalization comprises:
   transferring the images to a perception-based color space;
   clustering color distributions in the perception-based space;
   performing histogram equalization in the perception-based space; and
   transferring a result of the histogram equalization to a red-green-blue space.

20. One or more computer readable media storing computer executable instructions that, when executed, perform the method as recited in claim 15.

21. A digital camera configured to perform the method as recited in claim 15.

22. One or more computer-readable media having instructions stored thereon that, when executed, direct a machine to perform acts comprising:
   providing two images of a same scene;
   determining a spatial coherence and color statistics of the two images, wherein the determining the spatial coherence comprises utilizing spatial region matching, wherein the spatial region matching comprises:
      segmenting a blurred one of the two images into a plurality of similarly colored regions;
      eroding each of the regions;
      determining a number of iterations to completely erode each region;
      determining a region center for each of the regions;
      sorting the iteration numbers in descending order;
      selecting pixel pairs from the images in matching positions; and
      calculating a neighborhood value for each selected pixel; and
   utilizing the determined color statistics and spatial coherence to enhance one of the two images.

23. A computer-readable medium as recited in claim 22, wherein the acts further comprise modifying a color mapping function of the two images to cover a larger range for a high contrast scene.

24. A computer-readable medium as recited in claim 22, wherein the acts further comprise utilizing color histogram equalization to determine the color statistics.

25. A computer-readable medium as recited in claim 22, wherein the acts further comprise utilizing color histogram equalization to determine the color statistics, wherein the color histogram equalization comprises:
   transferring the two images to a perception-based color space;
   clustering color distributions in the perception-based space;
   performing histogram equalization in the perception-based space; and
   transferring a result of the histogram equalization to a red-green-blue space.

26. One or more computer-readable media having instructions stored thereon that, when executed, direct a machine to perform acts comprising:
   providing an underexposed image of a scene;
   providing a blurred image of the same scene;
   determining a spatial coherence and color statistics of the images, wherein the determining the spatial coherence comprises utilizing spatial region matching, wherein the spatial region matching comprises:
      segmenting the blurred image into a plurality of similarly colored regions;
      eroding each of the regions;
      determining a number of iterations to completely erode each region;
      determining a region center for each of the regions;
      sorting the iteration numbers in descending order;
      select pixel pairs from the images in matching positions; and
      calculating a neighborhood value for each selected pixel; and
   utilizing the determined color statistics and spatial coherence to enhance the underexposed image.

27. A computer-readable medium as recited in claim 26, wherein the acts further comprise utilizing color histogram equalization to determine the color statistics.

28. A computer-readable medium as recited in claim 26, wherein the acts further comprise utilizing color histogram equalization to determine the color statistics, wherein the color histogram equalization comprises:

transferring the images to a perception-based color space;

clustering color distributions in the perception-based space;

performing histogram equalization in the perception-based space; and transferring a result of the histogram equalization to a red-green-blue space.

29. An apparatus comprising:

means for providing two images of a same scene;

means for determining a spatial coherence and color statistics of the two images, wherein the determining the spatial coherence comprises utilizing spatial region matching, wherein the spatial region matching comprises:

segmenting a blurred one of the two images into a plurality of similarly colored regions;

eroding each of the regions;

determining a number of iterations to completely erode each region;

determining a region center for each of the regions;

sorting the iteration numbers in descending order;

selecting pixel pairs from the images in matching positions; and calculating a neighborhood value for each selected pixel; and means for utilizing the determined color statistics and spatial coherence to enhance one of the two images.

30. An apparatus as recited in claim 29, further comprising means for modifying a color mapping function of the two images to cover a larger range for a high contrast scene.

31. An apparatus as recited in claim 29, further comprising means for utilizing color histogram equalization to determine the color statistics.

* * * * *